US 9,404,447 B2

(12) United States Patent
Rieger et al.

(10) Patent No.: US 9,404,447 B2
(45) Date of Patent: Aug. 2, 2016

(54) COOLER HAVING LIQUID SEPARATOR FOR USE WITH AN INTERNAL COMBUSTION ENGINE

(71) Applicant: Mahle International GmbH, Stuttgart (DE)

(72) Inventors: Harald Rieger, Waldachtal (DE); Hartmut Sauter, Renningen (DE); Hartmut Sohla, Beilstein (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/773,317

(22) PCT Filed: Mar. 4, 2014

(86) PCT No.: PCT/EP2014/054136
§ 371 (c)(1),
(2) Date: Sep. 4, 2015

(87) PCT Pub. No.: WO2014/135518
PCT Pub. Date: Sep. 12, 2014

(65) Prior Publication Data
US 2016/0010596 A1 Jan. 14, 2016

(30) Foreign Application Priority Data
Mar. 8, 2013 (DE) .......................... 10 2013 203 963

(51) Int. Cl.
*F02M 25/07* (2006.01)
*F01N 3/00* (2006.01)
*F28F 17/00* (2006.01)

(52) U.S. Cl.
CPC ............... *F02M 26/30* (2016.02); *F01N 3/005* (2013.01); *F02M 26/35* (2016.02); *F28F 17/005* (2013.01);
(Continued)

(58) Field of Classification Search
CPC ....... F02M 26/00; F02M 26/02; F02M 26/03; F02M 26/04; F02M 26/06; F02M 26/22; F02M 26/28; F02M 26/29; F02M 26/30; F02M 26/32; F02M 26/33; F02M 26/35; F02M 26/51; F02M 35/10222; F02M 25/0726; F02M 25/0731; F02M 25/0734; F02M 25/0735; F02M 25/0737; F02M 25/0738; F02M 25/074; F02M 25/0798; F01N 3/005; F01N 3/0205; F01N 13/00; F01N 2240/22; F01N 2250/10; F28F 17/005; F28F 2245/02; F28F 2245/04; F28F 2265/18; F28F 2265/22; F02B 47/08; F02B 47/10; F02D 41/0025; F02D 41/0047; F02D 41/0065; F01P 3/12
USPC ........................ 123/568.11, 568.12; 60/309
See application file for complete search history.

(56) References Cited

U.S. PATENT DOCUMENTS 3,868,830 A 3/1975 Fletcher et al.
6,301,887 B1 * 10/2001 Gorel .................... F01N 3/0222
 123/563

(Continued)

FOREIGN PATENT DOCUMENTS

DE 2334086 A1 1/1974
DE 102005050133 A1 4/2006
(Continued)

OTHER PUBLICATIONS

English abstract for DE-102007025704.
(Continued)

*Primary Examiner* — Grant Moubry
(74) *Attorney, Agent, or Firm* — Fishman Stewart PLLC

(57) ABSTRACT

A cooler for an internal combustion engine may include a cooler block including a gas path for communicating a gas flow along a gas flow direction and a coolant path for communicating a coolant flow. The gas path and the coolant path may be thermally coupled to each other and may be fluidly separated from each other. The cooler may include a liquid separator for separating a liquid from the gas flow. The liquid separator may be arranged on the cooler block at an outlet side of the gas path. The liquid separator may include a reservoir for the separated liquid and an evaporator for evaporating the separated liquid.

20 Claims, 5 Drawing Sheets

(52) U.S. Cl.
CPC ......... *F28F 2245/02* (2013.01); *F28F 2245/04* (2013.01); *F28F 2265/18* (2013.01); *F28F 2265/22* (2013.01); *Y02T 10/121* (2013.01)

(56) References Cited

U.S. PATENT DOCUMENTS

| | | | | |
|---|---|---|---|---|
| 6,953,083 | B2 * | 10/2005 | Kawakami | ........... B01D 5/0012 165/114 |
| 7,530,349 | B2 * | 5/2009 | Rim | ........... F01N 5/02 123/568.15 |
| 7,721,543 | B2 * | 5/2010 | Massey | ........... F01P 9/02 60/39.511 |
| 8,104,456 | B2 * | 1/2012 | Yacoub | ........... F02B 37/00 123/25 A |
| 8,925,624 | B2 * | 1/2015 | Kuroyanagi | ........ F02M 25/0737 165/157 |
| 2008/0277106 | A1 | 11/2008 | Janssens | |
| 2009/0020263 | A1 * | 1/2009 | Ohsawa | ........... F28D 1/0435 165/104.11 |
| 2010/0300647 | A1 | 12/2010 | Steurer et al. | |
| 2011/0168128 | A1 * | 7/2011 | Bradley | ........... F01N 3/005 123/294 |
| 2011/0225959 | A1 * | 9/2011 | Sailer | ........... F02M 26/14 60/309 |
| 2014/0102428 | A1 * | 4/2014 | Fulton | ........... F02B 29/0468 123/568.12 |

FOREIGN PATENT DOCUMENTS

| | | |
|---|---|---|
| DE | 102007025704 A1 | 12/2008 |
| EP | 1265048 A1 | 12/2002 |
| EP | 2256450 A2 | 12/2010 |
| GB | 1417282 A | 12/1975 |
| JP | 2007-519889 A | 7/2007 |
| JP | 2009-275673 A | 11/2009 |
| JP | 2012-188944 A | 10/2012 |
| WO | WO-2005/075057 A1 | 8/2005 |
| WO | WO-2010/128993 A1 | 11/2010 |

OTHER PUBLICATIONS

English abstract for DE-102005050133.
English abstract for JP2012188944.
English translation of JP Office Action for JP2015-560657, mailed May 23, 2016.
English abstract provided for JP-2009275673.

* cited by examiner

COOLER HAVING LIQUID SEPARATOR FOR USE WITH AN INTERNAL COMBUSTION ENGINE

CROSS-REFERENCE TO RELATED APPLICATIONS

This application claims priority to German Patent Application No. 10 2013 203 963.8, filed Mar. 8, 2013, and International Patent Application No. PCT/EP2014/054136, filed Mar. 4, 2014, both of which are hereby incorporated by reference in their entirety.

TECHNICAL FIELD

The present invention relates to a cooler for cooling a gas flow, in particular an exhaust gas return cooler for the cooling of returned exhaust gas. In addition, the invention relates to a use of such a cooler.

BACKGROUND

A cooler usually comprises a cooler block, which has a gas path through which the gas flow can flow and a coolant path through which a coolant can flow, the gas path and the coolant path being thermally coupled to each other in a media-separated manner.

Such coolers come into use in a varied manner in vehicles. A particular form of application is produced in the exhaust gas return, in which exhaust gas is fed from an exhaust gas system externally to a fresh air system, in order to mix the returned exhaust gas with the fresh air upstream of combustion chambers of an internal combustion engine. Such an exhaust gas return (EGR) has proved to be advantageous with regard to the fuel consumption and the pollutant emissions of the internal combustion engine. In turbocharged internal combustion engines, a differentiation is made between a high pressure exhaust gas return (HP EGR) and a low pressure exhaust gas return (LP EGR). A turbocharged internal combustion engine is equipped with an exhaust gas turbocharger, the turbine of which is arranged in the exhaust gas system and the compressor of which is arranged in the fresh air system. Here, the compressor and turbine divide the fresh air system and the exhaust gas system respectively into a high pressure region and a low pressure region. The low pressure region on the fresh air side extends upstream of the compressor. The high pressure region on the fresh air side extends downstream of the compressor. The low pressure region on the exhaust gas side extends downstream of the turbine. The high pressure region on the exhaust gas side extends upstream of the turbine. A high pressure exhaust gas return (HP EGR) therefore takes place upstream of the turbine and downstream of the compressor. In contrast thereto, a low pressure exhaust gas return (LP EGR) takes place downstream of the turbine and upstream of the compressor.

In the exhaust gas, water can be contained in the form of water vapour, which can arise through the combustion processes. Likewise, water can be contained in the form of water vapour in the fresh air drawn in from the environment. The returned exhaust gas is generally cooled by means of an exhaust gas return cooler, for example in order to increase the mass flow of the fresh air. Depending on the environmental conditions, the returned gas can cool here below the dew point of water, whereby a condensation can occur, so that therefore liquid water accumulates. Hereby, drops can form, which can damage components which follow downstream. Here, both mechanical and corrosive damage is possible. In particular, a compressor wheel, which rotates at a high rotation speed in the compressor, is exposed to an increased risk of damage through the collision with droplets. In addition, condensate can settle and, in unfavourable environmental conditions, can freeze. Here, also, in particular the compressor wheel is exposed to an increased risk.

The risk of a condensate formation is particularly critical in a low pressure exhaust gas return, because there the returned exhaust gas is regularly cooled to a lower temperature level than in a high pressure exhaust gas return.

Preferred forms of application of such coolers are therefore EGR coolers, which can be integrated into a low temperature cooling circuit (LT cooling circuit) for a particularly high cooling efficiency, i.e. into a liquid cooling circuit, preferably a conventional engine cooling circuit. Such LT EGR coolers can, in particular in utility vehicles, come into use in the HP region or in the LP region, so that the concern is then with LT HP EGR coolers or respectively LT LP EGR coolers.

Apart from the water vapour, the exhaust gas can additionally contain various combustion residues, which are present in particle form. In particular, the combustion residues can contain soot, mineral components, ceramic particles or silicates.

Coolers of the type named in the introduction can also be used in buildings, in particular for air-conditioning the room air. Further possibilities for use of such coolers are, for example, a battery cooling, e.g. in electric vehicles, or in connection with an air supply of fuel cells. In addition to liquids or respectively condensate, the respective gas flow can also contain solids, such as e.g. dust, silicates (e.g. sand) or organic substances.

SUMMARY

The present invention is concerned with the problem of indicating an improved embodiment or respectively a novel use, for a cooler of the type named in the introduction, which can be designed in particular as an exhaust gas return cooler, which is distinguished in that in the case of a condensate formation, the risk of damage to subsequent components is reduced.

This problem is solved according to the invention by the subjects of the independent claims. Advantageous embodiments are the subject of the dependent claims.

The invention is based on the general idea of equipping the cooler with a liquid separator. By means of such a liquid separator, liquid can be separated from the gas flow, so that the gas flow emerging from the cooler contains no or only a reduced quantity of liquid. Consequently, the risk of damage to subsequent components is reduced. Expediently, the liquid separator is arranged on the cooler block on an outlet side of the gas path. Hereby, it is ensured that as much liquid as possible which accumulates within the gas path can be gathered by the liquid separator. Liquid which accumulates in the gas path upstream of the outlet side is transported through the gas flow in the direction of the outlet side and is therefore fed to the liquid separator.

According to an advantageous embodiment, the liquid separator can have a gas duct which has a duct cross-section able to be flowed through by the gas flow, which is largely blocked by a separation structure able to be flowed through by the gas flow. As the separation structure completely or at least substantially blocks the duct cross-section, the gas flow is forced to flow through the separation structure. Subsequently, entrained liquid and/or solid impurities can attach to the separation structure and can be separated from the gas flow.

According to a further development, a collecting duct can adjoin the duct cross-section in gravitational direction, which collecting duct runs transversely to the gas duct, which is open to the gas duct and which is arranged so that a drip edge of the at least one separation structure adjoins thereto in the gravitational direction. In this way, the separated impurities can be discharged particularly simply from the separation structure. The respective drip edge is preferably arranged outside the duct cross-section of the gas duct and, instead, arranged inside the collecting duct, whereby the dripping of the separated impurities into the collecting duct is improved.

Expediently, a drain line can be connected to the collecting duct, in order to discharge the separated impurities e.g. to a reservoir.

An embodiment in which several separation structures are arranged in series in the gas duct is particularly efficient. The individual separation structures can be configured identically here or else can be equipped with different separation effects. Expediently, the adjacent separation structures are arranged spaced apart from one another.

Preferably, the respective separation structure can be formed by a hydrophobic fabric. A metal fabric, e.g. of steel or high-grade steel, is preferred. However, ceramic fabrics are also conceivable.

A simplified structure is produced when the respective separation structure is arranged on a carrier which extends transversely through the duct cross-section. Hereby, the respective separation structure can itself be relatively flexible, which permits the use of materials and structures which have relatively low flow resistances and/or high separation effects.

In addition, the liquid separator can have a housing which contains the gas duct and which is mounted onto the cooler block. Hereby, the liquid separator represents a separate assembly, which can be mounted in a particularly simple manner onto the cooler block if required.

According to an advantageous embodiment, the gas path can have several wall surfaces in the cooler block, on which a liquid film can form. The liquid separator then expediently directly adjoins a face side of the cooler block having the wall surfaces on the gas outlet side, and discharges the liquid film there. In this embodiment, the liquid separator serves primarily to receive and discharge the liquid film flowing along the wall surfaces, so that a droplet formation in the gas flow can be avoided. In addition, the liquid separator can also separate droplets already entrained in the gas flow, which can already form for example within the cooler.

In an expedient further development, the liquid separator can have webs which directly adjoin the face side of the cooler block on the gas outlet side and direct the liquid film to a collecting structure of the liquid separator. By means of these webs, it is achieved that the liquid film, which on the face side of the cooler block on the gas outlet side can not flow off along this face side due to gravity, but rather impacts onto the webs and is passed on by these to the collecting structure. In particular, the wall surfaces on which the liquid film forms delimit individual gas ducts in the cooler block, which can be arranged adjacent to one another in particular in the gravitational direction. When a liquid film on a wall surface emerges from such a gas duct, gravity drives it in the direction of the next gas duct lying therebeneath. There, drops could form and be entrained by the gas flow. As such a flowing off to the next gas duct can be prevented by means of the webs, thereby a drop formation in the gas flow can also be efficiently prevented.

According to another further development, the liquid separator can have a plate body, which extends transversely to the gas flow, which has through-openings aligned to gas-side outlet openings of the cooler block, and from which the webs project. The previously mentioned gas ducts have, on the outlet side, the said outlet openings of the cooler block. Through the plate body, configured in a complementary manner to the outlet side of the cooler block, such that the through-openings of the plate body are aligned to the outlet openings of the cooler block axially, i.e. in the flow direction of the gas flow, only a comparatively small through-flow resistance is produced through the plate body and therefore through the liquid separator. In addition, the liquid separator thereby has a comparatively simple structure. In particular, the plate body can be produced integrally from one piece with the webs projecting therefrom.

The fibre structure can basically have any desired structure suitable for the receiving of liquid, in particular also a hydrophobic structure. According to a preferred further development, the plate body can, however, have a hydrophilic fibre structure, which receives the liquid film. Hereby, the liquid film can be discharged rapidly from the gas flow, whereby the risk of an entrainment of droplets through the gas flow is reduced.

In another embodiment, the liquid separator can have discharge gaps, which directly adjoin the gas-side outlet ends of the wall surfaces transversely to the gas flow direction, so that the liquid film can enter from the respective wall surface into the respective discharge gap and is able to be discharged therein. In contrast to the previously mentioned embodiment, in which the webs discharge the liquid film flowing off from the gas ducts on the outlet side, in this embodiment the discharge gaps make provision that the respective liquid film can flow off out from the region of the gas flow transversely to the gas flow.

Basically here, the respective liquid film can enter into the respective discharge gap owing to gravity. According to a particularly advantageous further development, however, provision can be made to dimension the respective discharge gap so that capillary forces suck the liquid film into the discharge gap and discharge it therein. The discharge gaps, which extend transversely to the gas flow direction, are parallel to the gas flow direction and therefore dimensioned relatively small, in order to be able to utilize the capillary forces. The capillary forces bring about a particularly efficient suction of the liquid film, without additional energy-consuming measures being necessary.

In another further development, the liquid separator can have a fibre structure which adjoins the respective discharge gap and/or is arranged in the respective discharge gap. The fibre structure can basically have any desired structure suitable for the receiving and discharging of liquid, in particular also a hydrophobic structure. However, it is preferably a hydrophilic fibre structure. The fibre structure receives the liquid film and can pass it on within the liquid separator.

In another further development, the liquid separator can have a plate body, which extends transversely to the gas flow, which has through-openings aligned to gas-side outlet openings of the cooler block and which has a web structure projecting therefrom, directly abutting onto the face side of the cooler block on the gas outlet side, so that the discharge gaps are delimited by the face side on the gas outlet side and an inner side of the plate body facing the cooler block. Hereby, an extremely compact structure is produced for the liquid separator. In addition, it is noteworthy that the liquid separator is only completed and operational through the arranging of the plate body on the cooler block.

In another advantageous embodiment, the liquid separator can have a fibre structure which extends completely over a face side of the cooler block on the gas outlet side, which is able to be flowed through by the gas flow and which receives and discharges the liquid emerging from the gas path. The fibre structure can basically have any desired structure suitable for the receiving and discharging of liquid, in particular also a hydrophobic structure. Preferably, however, it is a hydrophilic fibre structure. In this embodiment, the liquid separator has an extremely simple structure, which can be realized in a particularly economical manner.

According to an advantageous further development, provision can be made here that the fibre structure is arranged spaced apart from the cooler block in the gas flow direction. Hereby, it is achieved that the fibre structure provides substantially more volume which is able to be flowed through than in an arrangement of the fibre structure directly on the cooler block. Hereby, the through-flow resistance of the fibre structure can be significantly reduced.

The fibre structure here can be a single-layer or multi-layered fabric or knit. It can be a ceramic or a metallic fibre structure here. A fibre structure of plastic can likewise also come into use here.

In another advantageous embodiment, the liquid separator can have a reservoir for separated liquid and an evaporator for evaporating the separated liquid. By means of the evaporator, the reservoir can be emptied again. In this embodiment, the circumstance is allowed for that a condensate formation in the cooler, in particular with an application as an exhaust gas return cooler on the low pressure side, only takes place under particular environmental conditions or respectively operating states, whereas in the case of many other environmental conditions or respectively operating states no condensation occurs. Furthermore, operating states and environmental conditions can also prevail, in which even an evaporation of water is possible. By means of the reservoir, the separated condensate can therefore be collected for phases in which condensate accumulates. By means of the evaporator, the reservoir can then be emptied again in phases in which an evaporation of the condensate is possible. In this way, a complex discharging of the condensate into the environment can be dispensed with.

The reservoir can optionally be equipped with an overflow, in order to be able to guarantee the operational capability of the liquid separator even in the case of a full reservoir. Additionally or alternatively, the reservoir can be equipped with baffle plates or respectively with a baffle structure. In particular in vehicle applications, the dynamics of the driving operation within the reservoir can accelerate the liquid, whereby waves can occur in the reservoir, which can cause the reservoir to spill over. Thereby, stored liquid could arrive back into the gas flow via the discharge structure. A baffle structure counteracts the wave formation, whereby also a spilling over can also be prevented.

According to another advantageous further development, the evaporator can be temperature-controlled as a function of the temperature of the gas flow downstream of the cooler block. Hereby, it is achieved that the evaporation is only actively operated at temperatures in the gas flow above the evaporation temperature of the water.

In a simple case, the evaporator can be a type of wick. Owing to capillary forces, the wick conveys the separated water out from the reservoir to a wick end, which is exposed to the gas flow. With sufficient gas temperature, the desired evaporation of the liquid occurs here at the wick end. A separating of droplets, on the other hand, is not to be expected, owing to the high capillary forces in the wick.

In another embodiment, the evaporator can operate with a pump which feeds the liquid out from the reservoir to an evaporation surface during an evaporation operation, i.e. with a sufficient gas temperature.

It is also possible to arrange a heating device in the reservoir, by means of which the liquid stored therein can be evaporated. The heating device can be operated electrically, for example. It is also possible to realize the heating device by means of at least one so-called heat pipe which, for example, couples a base of the reservoir with the cooler block, in order to transfer heat from the cooler block to the base of the reservoir.

Furthermore, the evaporator can operate for example with an ejector pump, wherein the gas flow in a venturi nozzle of the ejector pump generates the vacuum for drawing the liquid out from the reservoir.

Additionally or alternatively, the evaporator can have corresponding valves, in order to be able to actively control a feeding of the liquid to the gas flow.

In another advantageous embodiment, the evaporator can feed the separated liquid for evaporating to the fibre structure, which during the separation phase serves to receive the liquid from the gas flow or respectively the liquid film from the cooler block.

A use according to the invention of a cooler of the type described above takes place in an exhaust gas return system for the cooling of returned exhaust gas. Accordingly, the present invention also concerns an exhaust gas return cooler and an exhaust gas return system with such an exhaust gas return cooler. Finally, the present invention additionally concerns an internal combustion engine with such an exhaust gas return system. Preferably, the exhaust gas return cooler comes into use in a low pressure exhaust gas return of a turbocharged internal combustion engine.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
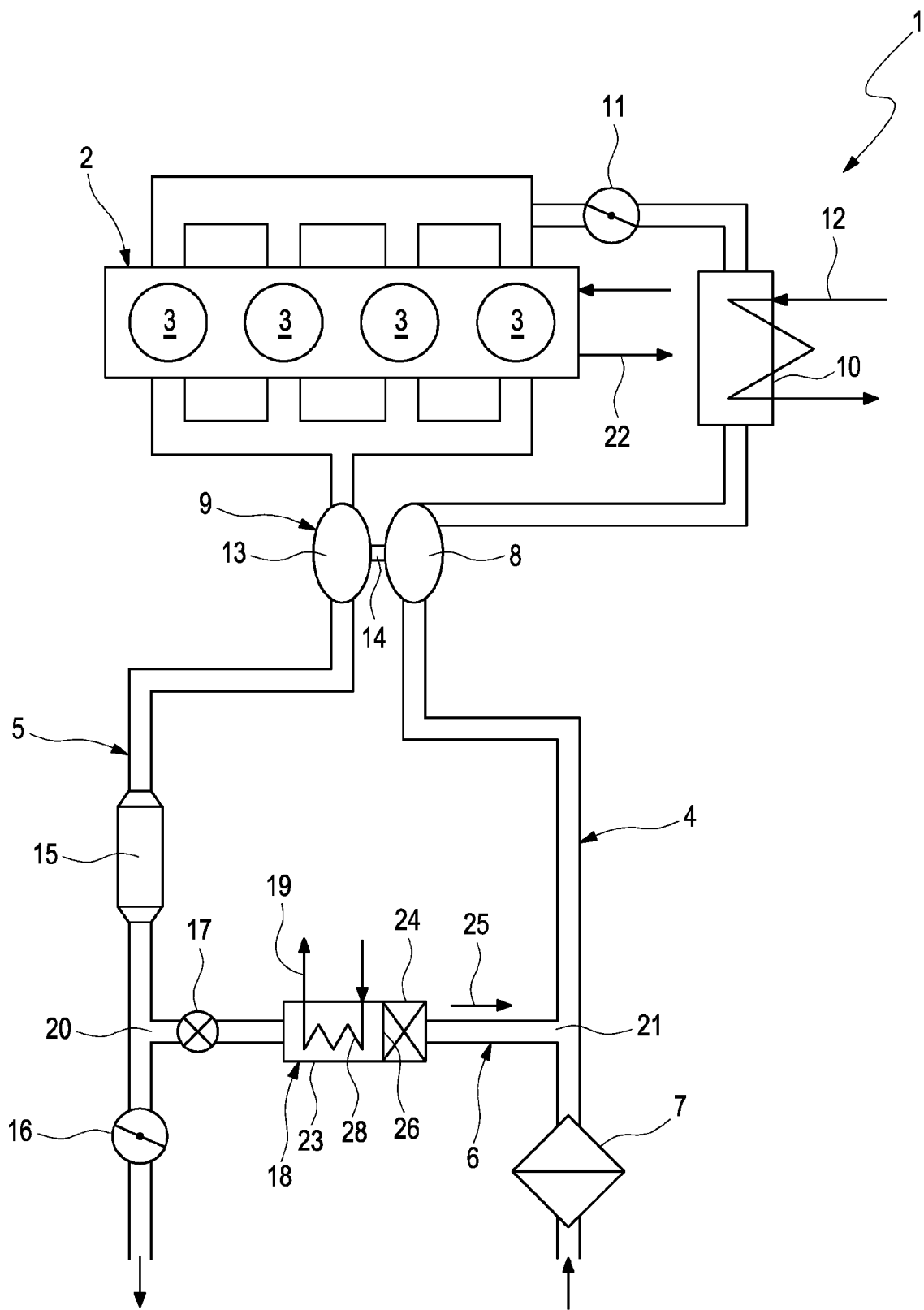
FIG. 1 a highly simplified schematic diagram, in the manner of a circuit diagram, of an internal combustion engine, FIG. 2 a highly simplified longitudinal section through a cooler in the region of a liquid separator, FIG. 3 an axial view of the liquid separator according to a detail III in FIG. 2, FIG. 4 an isometric view of a plate body of the liquid separator, FIG. 5 a sectional view as in FIG. 2, but in another embodiment, FIG. 6 a sectional view as in FIGS. 2 and 5, but in a further embodiment, FIG. 7 a sectional view as in FIG. 6, but in another embodiment, FIG. 8 an axial view of the liquid separator in another embodiment, but without separation structure, FIG. 9 an axial section of the liquid separator of FIG. 8 according to section lines IX in FIG. 8, but with separation structures, FIG. 10 an enlarged cross-section of the liquid separator of FIGS. 8 and 9, but with separation structure according to section lines X in FIG. 9.

According to FIG. 1, an internal combustion engine 1 comprises an engine block 2 with several combustion chambers 3, a fresh air system 4 for feeding fresh air to the combustion chambers 3, an exhaust gas system 5 for the discharging of exhaust gas from the combustion chambers 3 and an exhaust gas return system 6 for the returning of exhaust gas from the exhaust gas system 5 to the fresh air system 4. The fresh air system 4 contains a fresh air filter 7, a compressor 8 of an exhaust gas turbocharger 9, a charge air cooler 10 and a throttle device 11, for example in the form of a throttle valve.

The charge air cooler 10 is connected to a cooling circuit 12. The exhaust gas system 5 contains a turbine 13 of the exhaust gas turbocharger 9, which is connected with the compressor 8 via a drive shaft 14. In addition, the exhaust gas system 5 contains a catalytic converter 15 and a throttle device 16, for example in the form of a sensor flap.

The exhaust gas return system 6 contains an exhaust gas return valve 17 and an exhaust gas return cooler 18, which is connected to a cooling circuit 19. An extraction point 20 of the exhaust gas return system 6 is arranged here downstream of the turbine 13 on the exhaust gas system 5. An introduction point 21 of the exhaust gas return system 6 is arranged here upstream of the compressor 8 on the fresh air system 4. Accordingly, a low pressure exhaust return is concerned here.

The cooling circuit 12 of the charge air cooler 10 and/or the cooling circuit 19 of the exhaust gas return cooler 18 can be coupled with an engine cooling circuit 22. Likewise, this can respectively be a separate cooling circuit here.

The exhaust gas return cooler 18, which is also designated generally as "cooler 18" below, comprises according to FIGS. 1 to 6 a cooler block 23 and a liquid separator 24 for the separating of liquid from a gas flow 25, which flows through the cooler block 23. The liquid separator 24 is arranged here on a gas-side outlet side 26 of the cooler block 23.

The cooler block 23 has a gas path 27 which is able to be flowed through by the gas flow 25, which gas path is indicated by arrows in FIGS. 2, 5, 6 and 7. Furthermore, the cooler block 23 contains a coolant path 28, which can be seen in FIG. 1, which is able to be flowed through by a preferably liquid coolant. The coolant path 28 and the gas path 27 are thermally coupled to each other, but in a media-separated manner. Accordingly, the coolant path can extract heat from the gas path.

According to FIGS. 2 to 6, the gas path 27 in the cooler block 23 can contain several gas ducts 29, which are delimited laterally by wall surfaces 30. In the operation of the cooler 18 with corresponding marginal conditions a liquid film 31 can form on these wall surfaces 30, namely through condensation of water vapour, which is entrained in the gas flow 25. This deposit on the wall surfaces 30 then forms the liquid film 31 which, driven by the gas flow 25, exits from the gas ducts 29.

According to FIGS. 2 to 4 and 5, the liquid separator 24 is directly connected to a face side 32 of the cooler block 23 on the gas outlet side, which coincides here with the outlet side 26 of the gas path 27. Therefore, the liquid separator 24 can discharge the liquid film 31.

Figure 2:
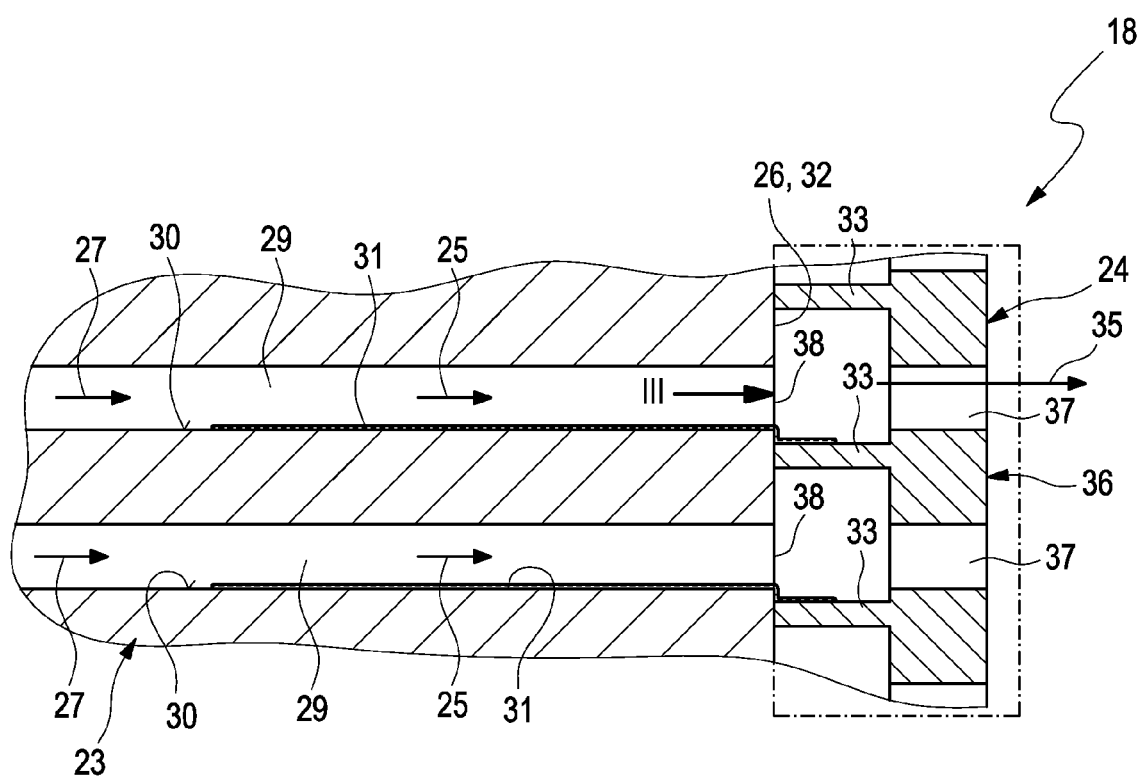
Figure 3:
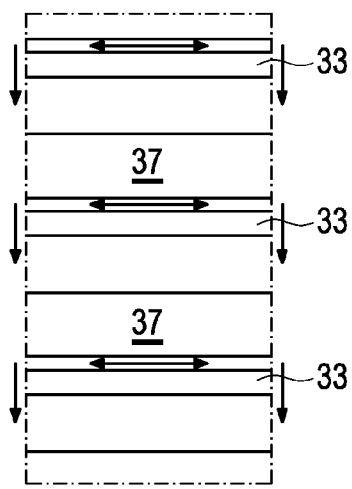
Figure 4:
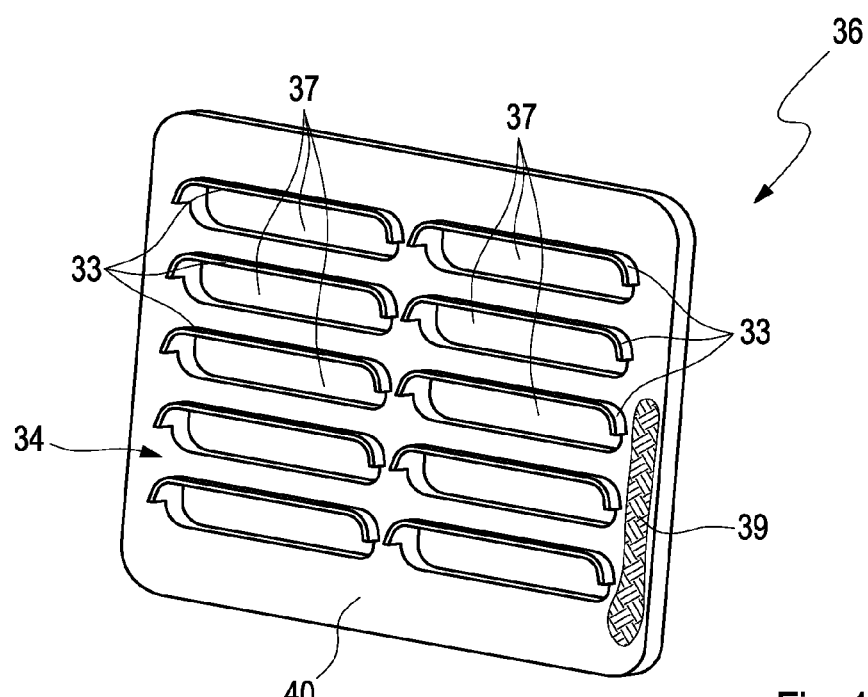

According to the embodiment shown in FIGS. 2 to 4, the liquid separator 24 can have webs 33, which directly adjoin onto the face side 32 of the cooler block 23 on the gas outlet side. The webs 33 guide the liquid film 31 emerging out from the gas ducts 29 to a collecting structure 34 of the liquid separator 24. Therefore, the accumulated liquid according to FIG. 3 can firstly be deflected laterally along the webs 33 transversely to the gas flow direction 35 and then discharged, for example downwards, along the collecting structure 34.

According to FIG. 4, the liquid separator 24 can have a plate body 36, which extends transversely to the gas flow direction 35. The plate body 36 has several through-openings 37, which are configured in a complementary manner to outlet openings 38 of the cooling body 23 on the gas side with regard to number, arrangement and dimensioning. Accordingly, the through-openings 37 are arranged axially aligned to the outlet openings 38 with respect to the gas flow direction 35. The plate body 36 can have a hydrophilic structure 39, which is indicated in FIG. 4 purely by way of example on the right edge side of the plate body 36. It is clear that basically the entire inner side 40 of the plate body 36 facing the cooler block 23 can be provided with such a fibre structure 39. The fibre structure 39 is configured here so that it can receive the liquid film 31.

Figure 5:
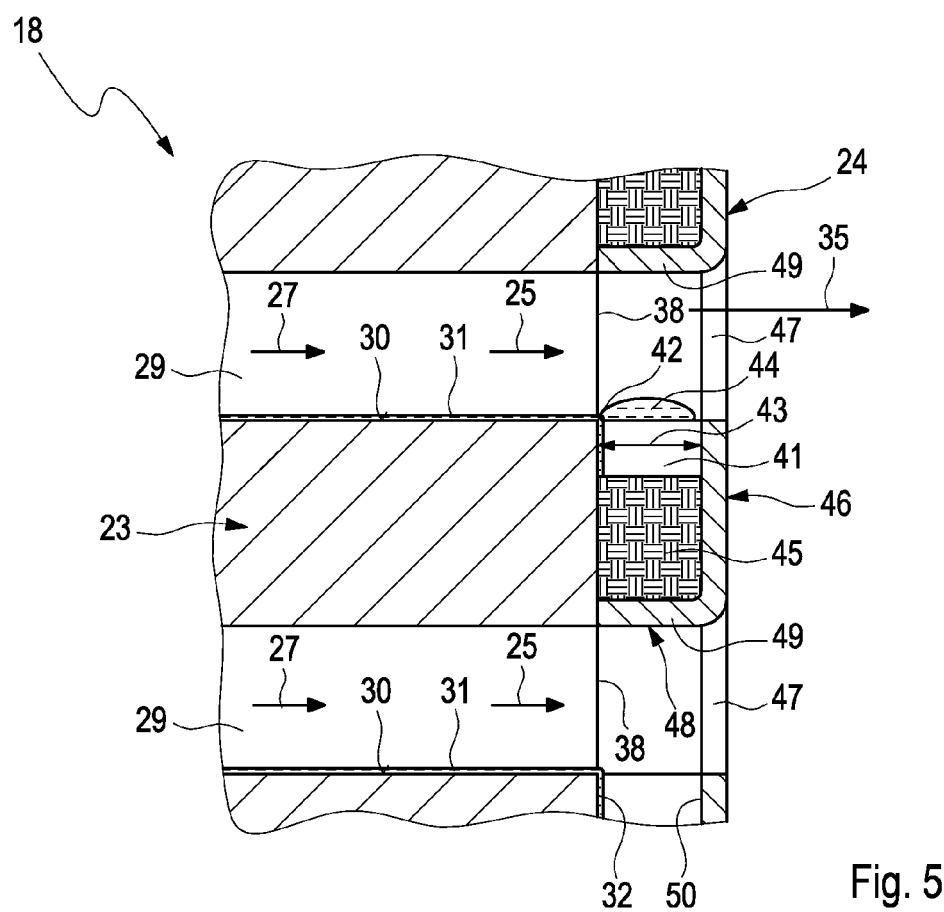

A different embodiment of the liquid separator 24 is illustrated in FIG. 5, in which discharge gaps 41 are constructed, which extend transversely to the gas flow direction 35 and adjoin here directly onto the gas-side outlet ends 42 of the wall surfaces 30. Accordingly, the respective liquid film 31 can enter from the respective wall surface 30 into the respective discharge gap 41, wherein the respective liquid film 31, which enters into such a discharge gap 41, is discharged in the discharge gap 41. Expediently, a gap width 43 is dimensioned so that capillary forces arise, which draw the liquid film 31 into the discharge gap 41 and bring about a discharging of the liquid in the discharge gap 41. For example, according to FIG. 5, liquid which is delivered with the liquid film 31 can collect at the respective outlet end 42 of the wall surface 30 in an inlet region 44 of the respective discharge gap 41, until it is drawn into the discharge gap 41 by the capillary forces and is discharged therein.

Also in this embodiment the liquid separator 24 can have a hydrophilic fibre structure 45, which as in the example of FIG. 5 can be arranged within the respective discharge gap 41. It is also possible that the respective discharge gap 41 leads with its capillary action up to such a fibre structure 45.

Expediently, the liquid separator 24 can also have a plate body 46 in this embodiment, which extends transversely to the gas flow 25, which has through-openings 47 aligned to the gas-side outlet openings 38 of the cooler block 23 and which has a web structure 48 projecting from the plate body 46. The web structure 48 comprises several webs 49, which respectively abut directly onto the face side 32 of the cooler block 23 on the gas outlet side. In this way, the discharge gaps 41 are delimited on the one hand by the face side 32 on the gas outlet side and on the other hand by an inner side 50 of the plate body 46 facing the cooler block 23.

Figure 6:
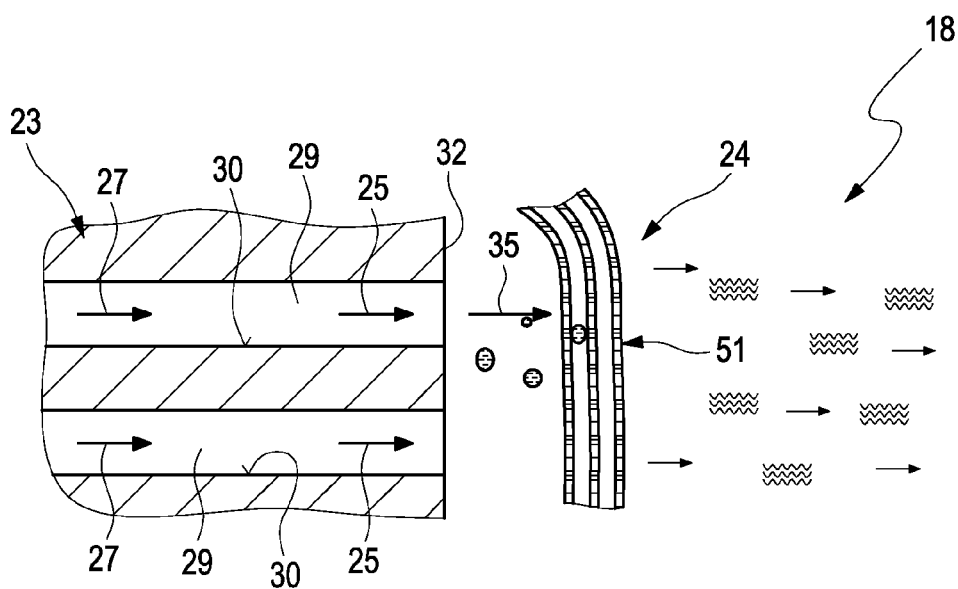
Figure 7:
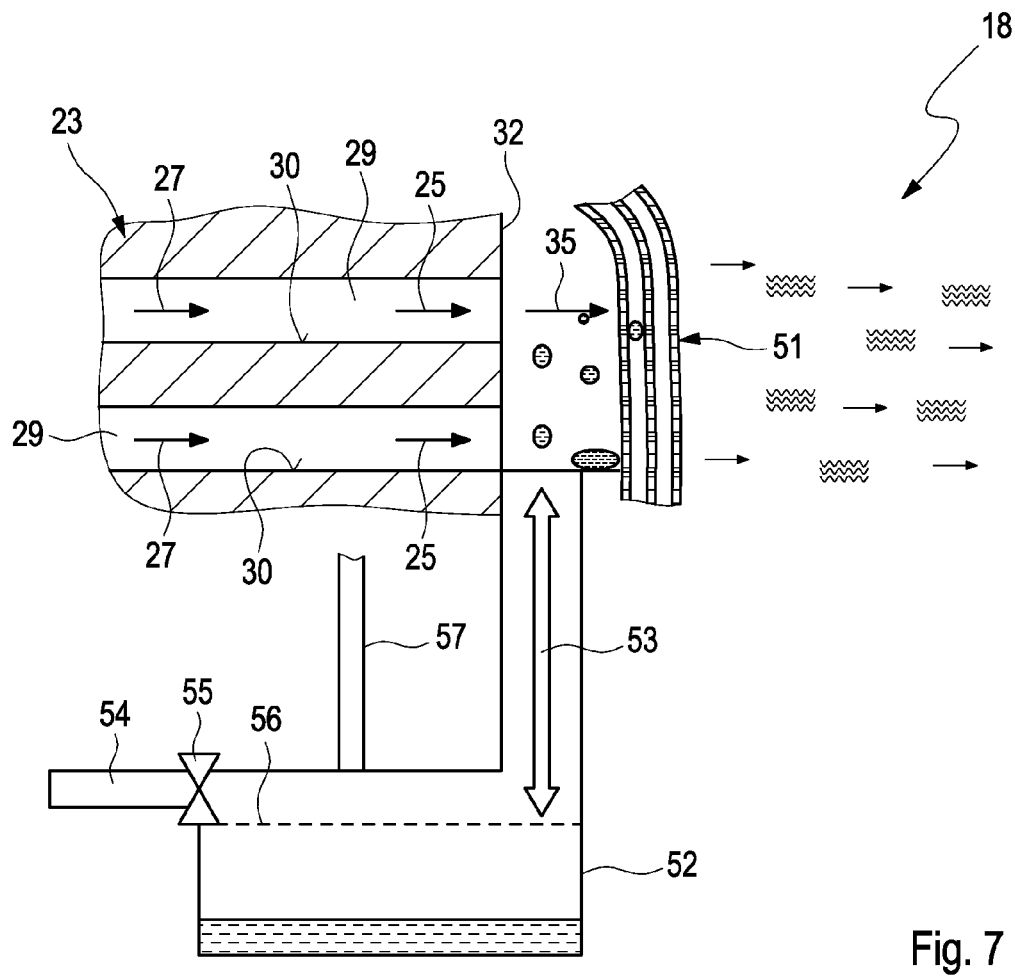

According to FIGS. 6 and 7, the liquid separator 24 can also be formed by means of a hydrophilic fibre structure 51, which extends completely over the face side 32 of the cooler block 23 on the outlet side. The fibre structure 51 is able to be flowed through by the gas flow 25 and is configured so that it can receive and discharge the liquid emerging from the gas path 27. In the particular embodiment shown in FIGS. 6 and 7, the fibre structure 51 is arranged spaced apart from the face side 32 of the cooler block 23 on the outlet side in the gas flow direction 35. Hereby, the entire surface of the fibre structure 51 is available for oncoming flow and through-flow for the gas flow 25, whereby the flow resistance of the fibre structure 51 is reduced. The fibre structure 51 can be a ceramic or metallic warp-knitted fabric or knit. The fibre structure 51 can be single-layered or multi-layered. In the example of FIGS. 6 and 7, a three-layered fibre structure 51 is indicated. An embodiment in which the individual layers of the fibre structure 51 maintain a predetermined distance relative to one another, which is suitable particularly for the receiving and discharging of liquid drops from the gas flow 25, is particularly advantageous here in the case of a multi-layered fibre structure 51.

In the embodiment shown in FIG. 7, the liquid separator 24, in addition to the embodiment shown in FIG. 6, is equipped with a reservoir 52, which can store the separated liquid. The respective liquid separator 24 can accordingly be configured so that it feeds the separated liquid to this reservoir 52. Such a reservoir 52 can be realized in all the embodiments shown here.

Furthermore, FIG. 7 shows an evaporator 53, by means of which the separated liquid can be evaporated from the reservoir 52. In operating phases in which condensate accumulates, this can be stored in the reservoir 52. In operating phases in which liquid can be evaporated, the reservoir 52 can be emptied again by means of the evaporator 53. In the example of FIG. 7, the reservoir 52 has an overflow 54, which can be controlled by a suitable valve 55. In the example of FIG. 7 in addition a baffle structure 56 is arranged in the reservoir 52, for example in the form of a grid, which makes provision that waves which can arise in the reservoir 52 in the operation of a vehicle equipped with the internal combustion engine 1 can not lead to a spilling over of the stored liquid.

The evaporator 53 is expediently temperature-controlled, and namely as a function of the temperature of the gas flow 25 downstream of the cooler block 23. In a particularly simple case, the evaporator 53 can have a wick which according to FIG. 7 conveys liquid up to a region which is exposed to the gas flow 25. A heat pipe 57 can also be arranged between the reservoir 52 and the cooler block 23, in order to evaporate liquid from the reservoir 52.

The evaporator 53 can be expediently configured here so that it feeds the separated liquid for evaporation to the fibre structure 51 again. This can take place according to FIG. 7 so that the evaporator 53 conveys the liquid into the region of the gas flow 25 such that droplets can detach themselves there, which are collected in the fibre structure 51 and evaporated. In FIG. 7, downstream of the fibre structure 51, a region is indicated in which the gas flow 25 contains water vapour.

Figure 8:
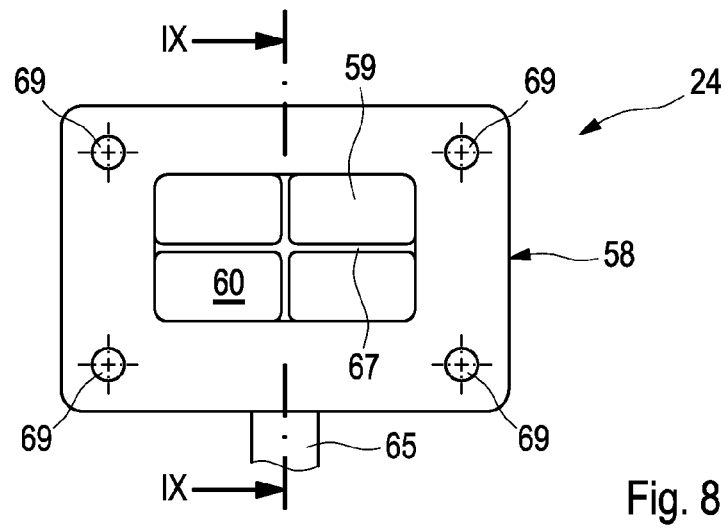
Figure 9:
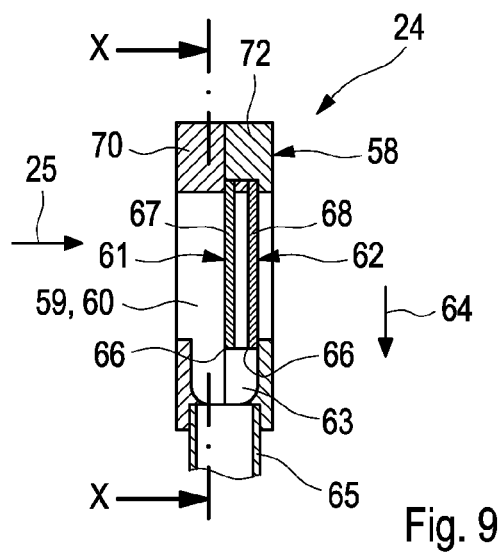
Figure 10:
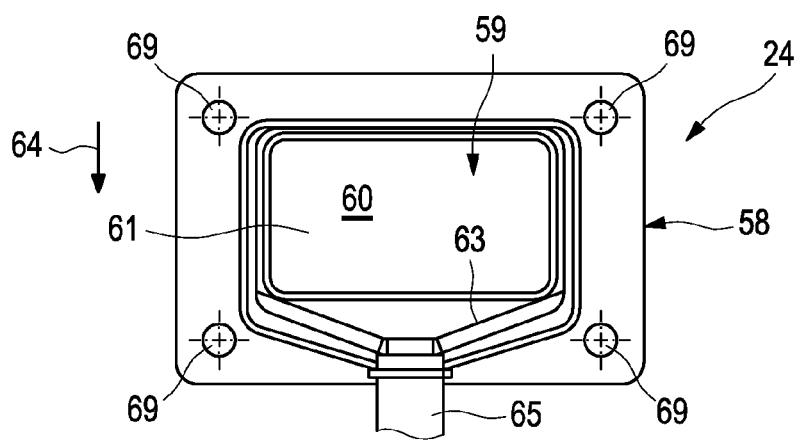

According to FIGS. 8 to 10, the liquid separator 24 can have a gas duct 59 in its own housing 58, which gas duct has a duct cross-section 60 which is able to be flowed through by the gas flow 25. The duct cross-section 60 is now largely, preferably completely, blocked by at least one separation structure 61, 62, which is able to be flowed through by the gas flow 25. In the example, two such separation structures 61, 62 are illustrated in FIG. 9, which are arranged one behind the other in the flow direction of the gas flow 25, i.e. are arranged in series, such that they are spaced apart from one another in the flow direction of the gas flow 25. Basically also a single separation structure 61, 62 can be sufficient; likewise, also more than two separation structures 61, 62 can be provided.

The respective separation structure 61, 62 is permeable for the gas flow 25, but forms an obstacle for entrained particles and in particular for entrained liquid droplets, on which obstacle the particles or respectively droplets can attach themselves, whereby they are separated from the gas flow 25. For example, the respective separation structure 61, 62 is a fabric of a hydrophobic material, such as e.g. a metal fabric, in particular of steel, preferably of high-grade steel.

According to FIGS. 9 and 10, the liquid separator 24 has in its housing 58 a collecting duct 63, which adjoins onto the duct cross-section 60 in the gravitational direction 64 indicated by an arrow. The collecting duct 63 collects the liquid separated by the respective separation structure 61, 62 and feeds it to a discharge line 65. The discharge line 65 can lead here to the reservoir 52, which has been explained with reference to the embodiment of FIG. 7. The collecting duct 63 extends transversely to the gas duct 59 and is open with respect to the gas duct 59, i.e. contrary to the gravitational direction 64. In addition, the collecting duct 63 is positioned so that a drip edge 66 of the respective separation structure 61, 62 adjoins thereto in the gravitational direction 64. Therefore, liquid received by the respective separation structure 61, 62 can flow off within the separation structure 61, 62 due to gravity in the direction of the drip edge 66 and can drip from the latter into the collecting duct 63. It is advantageous here if the respective drip edge 66 is already arranged outside the duct cross-section 60 of the gas duct 59 which is flowed through by the gas flow 25 and dips into the collecting duct 63. The liquid can then drip into the collecting duct 63 undisturbed by the gas flow 25. In addition, the collecting duct 63 is configured here so that it narrows in the gravitational direction 64 towards the discharge line 65.

For the respective separation structure 61, 62 respectively a carrier 67 or respectively 68 is provided, on which the respective separation structure 61, 62 is arranged or respectively fixed. The respective carrier 67, 68 extends transversely through the duct cross-section 60 and is formed, for example, by means of cruciform webs, which produce only a small flow resistance.

According to FIGS. 8 and 10, the housing 58 has openings 69, by which the liquid separator 24 can be mounted onto the cooler block 23, for example by means of a corresponding screw connection.

According to FIG. 9, the housing 58 can have two housing halves 70 and 71, between which the respective carrier 67, 68 and/or the respective separation structure 61, 62 can be clamped for fixing on the housing 58.

The invention claimed is:

1. A cooler for an internal combustion engine, said cooler comprising:
a cooler block including a gas path for communicating a gas flow along a gas flow direction and a coolant path for communicating a coolant flow, wherein the gas path and the coolant path are thermally coupled to each other and are fluidly separated from each other, and
a liquid separator for separating liquid from the gas flow, the liquid separator arranged on the cooler block at an outlet side of the gas path,
wherein the liquid separator includes a reservoir for the separated liquid and an evaporator for evaporating the separated liquid.

2. The cooler according to claim 1, wherein the liquid separator further includes a gas duct defining a duct cross-section being flowable through by the gas flow, wherein the duct cross-section of the gas duct is at least partially blocked by at least one separation structure configured to be flowed through by the gas flow.

3. The cooler according to claim 2, further comprising a collecting duct fluidly connected to the duct cross-section of the gas duct in a gravitational direction, wherein the collecting duct extends transversely to the gas duct and the collecting duct is fluidly open with respect to the gas duct, and wherein the collecting duct is arranged to engage a drip edge of the at least one separation structure in the gravitational direction.

4. The cooler according to claim 3, further comprising a discharge line fluidly connected to the collecting duct.

5. The cooler according to claim 2, further comprising a plurality of separation structures arranged in series in the gas duct.

6. The cooler according to claim 2, wherein the at least one separation structure is composed of a hydrophobic fabric.

7. The cooler according to claim 2, wherein the at least one separation structure is arranged on a carrier, and wherein the carrier extends transversely through the duct cross-section of the gas duct.

8. The cooler according to claim 2, wherein the liquid separator has a housing mounted onto the cooler block, the housing including the gas duct.

9. The cooler according to claim 1, wherein:
the gas path defines at least one wall surfaces disposed in the cooler block, the at least one wall surface configured to receive a liquid film, and
the liquid separator couples directly onto a face side of the cooler block on the outlet side of the gas path and discharges the liquid film.

10. The cooler according to claim 9, wherein the liquid separator further includes at least one web engaging directly onto the face side of the cooler block on the outlet side of the gas path, and wherein the at least one web directs the liquid film to a collecting structure of the liquid separator.

11. The cooler according to claim 10, wherein the liquid separator has a plate body extending transversely to the gas flow direction of the gas path, the plate body including a through-opening aligned with a gas-side outlet openings of the cooler block, and wherein the at least one web projects from the plate body.

12. The cooler according to claim 11, wherein the plate body further includes a hydrophilic fibre structure for receiving the liquid film.

13. The cooler according to claim 9, wherein the liquid separator has a discharge gap disposed at a gas-side outlet end of the at least one wall surface and extending transversely to the gas flow direction, wherein the discharge gap receives the liquid film from the at least one wall surface to discharged the liquid film.

14. The cooler according to claim 13, wherein the discharge gap is dimensioned so that capillary forces draw in the liquid film into the discharge gap.

15. The cooler according to claim 13, wherein the liquid separator further includes a hydrophilic fibre structure at least one of fluidly connected to discharge gap and arranged in the discharge gap.

16. The cooler according to claim 13, wherein the liquid separator has a plate body extending transversely to the gas flow, the plate body including a through-opening aligned with a gas-side outlet opening on a gas outlet side of the cooler block and a web structure projecting therefrom, wherein the web structure directly engages onto the face side of the cooler block, and wherein the discharge gap is delimited by the face side of the cooler block and an inner side of the plate body facing the face side of the cooler block.

17. The cooler according to claim 1, wherein the liquid separator further includes a hydrophilic fibre structure extending completely over a face side of the cooler block at a gas outlet side, wherein the fibre structure is flowable through by the gas flow and receives and discharges the separated liquid emerging from the gas path.

18. The cooler according to claim 17, wherein the fibre structure is arranged spaced apart from the cooler block in the gas flow direction.

19. The cooler according to claim 17, wherein the evaporator communicates the separated liquid for evaporation to the fibre structure.

20. The cooler according to claim 1, wherein the evaporator is temperature-controlled n response to a temperature of the gas flow downstream of the cooler block.

* * * * *